United States Patent
Dou

(10) Patent No.: US 6,930,073 B2
(45) Date of Patent: Aug. 16, 2005

(54) NIO CATALYST CONFIGURATIONS, METHODS FOR MAKING NOX ADSORBERS, AND METHODS FOR REDUCING EMISSIONS

(75) Inventor: Danan Dou, Tulsa, OK (US)

(73) Assignee: Delphi Technologies, Inc., Troy, MI (US)

(*) Notice: Subject to any disclaimer, the term of this patent is extended or adjusted under 35 U.S.C. 154(b) by 251 days.

(21) Appl. No.: 10/186,981

(22) Filed: Jul. 1, 2002

(65) Prior Publication Data

US 2003/0086851 A1 May 8, 2003

Related U.S. Application Data

(60) Provisional application No. 60/337,605, filed on Nov. 5, 2001.

(51) Int. Cl.[7] .......................... B01J 23/58; B01J 23/40; B01J 23/42; B01J 23/00; B01J 21/00
(52) U.S. Cl. ..................... 502/328; 502/259; 502/326; 502/327; 502/333; 502/334; 502/335; 502/337; 502/339; 502/527.12; 502/527.13
(58) Field of Search ................. 502/258, 259, 502/261, 262, 326–328, 330, 333–335, 337, 339, 527.12, 527.18

(56) References Cited

U.S. PATENT DOCUMENTS

| | | | |
|---|---|---|---|
| 5,128,306 A | * | 7/1992 | Dettling et al. ............ 502/304 |
| 5,130,109 A | | 7/1992 | Wan ....................... 423/213.2 |
| 5,212,142 A | * | 5/1993 | Dettling .................... 502/304 |
| 5,422,331 A | * | 6/1995 | Galligan et al. ........... 502/333 |
| 5,451,558 A | * | 9/1995 | Campbell et al. .......... 502/325 |
| 5,597,771 A | * | 1/1997 | Hu et al. .................. 502/304 |
| 5,736,482 A | * | 4/1998 | Durand et al. ............. 502/303 |
| 5,804,152 A | * | 9/1998 | Miyoshi et al. ........... 423/213.5 |
| 5,849,254 A | * | 12/1998 | Suzuki et al. ............. 423/213.5 |
| 5,849,660 A | * | 12/1998 | Takemoto et al. .......... 502/327 |
| 5,948,376 A | * | 9/1999 | Miyoshi et al. ........... 423/213.5 |
| 5,968,462 A | * | 10/1999 | Suzuki ..................... 423/213.2 |
| 5,972,829 A | * | 10/1999 | Ichimura ................... 502/303 |
| 5,990,038 A | * | 11/1999 | Suga et al. ................ 502/303 |
| 6,022,825 A | | 2/2000 | Andersen et al. ........... 502/303 |
| 6,087,298 A | * | 7/2000 | Sung et al. ................ 502/333 |
| 6,165,429 A | * | 12/2000 | Ikeda et al. .............. 423/213.5 |
| 6,217,831 B1 | * | 4/2001 | Suzuki et al. .............. 422/177 |
| 6,221,804 B1 | * | 4/2001 | Yamada et al. ............. 502/326 |
| 6,294,140 B1 | * | 9/2001 | Mussmann et al. ......... 423/213.5 |
| 6,391,822 B1 | | 5/2002 | Dou et al. |

(Continued)

FOREIGN PATENT DOCUMENTS

| | | | | |
|---|---|---|---|---|
| EP | 0625633 A1 | 11/1994 | ............ | F01N/3/24 |
| EP | 0664147 A2 | 7/1995 | ........... | B01D/53/86 |
| EP | 0878610 A1 | 11/1998 | ............ | F01N/3/08 |
| EP | 0905354 A2 | 3/1999 | ............ | F01N/3/08 |
| EP | 0931590 A1 | 7/1999 | ............ | B01J/37/02 |

Primary Examiner—Cam N. Nguyen
(74) Attorney, Agent, or Firm—Paul L. Marshall

(57) ABSTRACT

In one embodiment, a catalyst configuration, comprises: a substrate, a NiO layer disposed on the substrate, wherein the NiO layer comprises greater than or equal to about 75 wt % of the NiO in the catalyst configuration; and a catalyst layer comprising a NOx adsorbing catalyst. In another embodiment, a catalyst configuration, comprises: a substrate, a catalyst layer disposed on the substrate, wherein the catalyst layer comprises a NOx adsorbing catalyst and thermally treated NiO.

In one embodiment, the method for making a NOx adsorber comprises: thermally treating NiO to a temperature of about a maximum catalyst application temperature minus 100° C. and the maximum catalyst application temperature, disposing a catalyst configuration on the substrate, wherein the catalyst configuration comprises the thermally treated NiO and a NOx adsorption catalyst, and disposing the substrate in a housing.

16 Claims, 14 Drawing Sheets

U.S. PATENT DOCUMENTS

| | | |
|---|---|---|
| 6,497,092 B1 | 12/2002 | Theis |
| 6,497,848 B1 * | 12/2002 | Deeba et al. ............... 422/180 |
| 6,562,753 B2 * | 5/2003 | Miyoshi et al. ............. 502/325 |
| 6,625,976 B1 * | 9/2003 | Andersen et al. ............ 60/299 |
| 6,685,899 B1 * | 2/2004 | Park ....................... 423/213.5 |
| 6,692,712 B1 * | 2/2004 | Andersen ................. 423/239.1 |
| 6,764,665 B2 * | 7/2004 | Deeba et al. ............ 423/239.1 |
| 6,764,771 B1 * | 7/2004 | Heimberg et al. .......... 428/472 |
| 2002/0081242 A1 | 6/2002 | LaBarge et al. ............ 422/177 |

\* cited by examiner

NIO CATALYST CONFIGURATIONS, METHODS FOR MAKING NOX ADSORBERS, AND METHODS FOR REDUCING EMISSIONS

CROSS REFERENCE TO RELATED APPLICATIONS

The present application is a U.S. non-provisional application based upon and claiming priority from U.S. provisional application No. 60/337,605, with a filing date of Nov. 5, 2001, which is hereby incorporated by reference.

BACKGROUND OF THE INVENTION

In order to meet government mandated exhaust gas emission standards, the exhaust gases of an automotive internal combustion engine must be treated before emission into the atmosphere. Exhaust gases are routed through a catalytic converter device. The exhaust gases generally contain undesirable emission components including carbon monoxide (CO), hydrocarbons (HC), and nitrogen oxides ($NO_x$). As a means of simultaneously removing the objectionable CO, HC, and $NO_x$ components, various "three-way" catalysts have been developed. Such catalysts can employ one or more platinum group metals (PGM) such as platinum (Pt), palladium (Pd), and rhodium (Rh). As such, the undesirable components can then be converted to less harmful or non-harmful ones.

Direct injection gasoline (GDI) engines and diesel engines offer fuel economy and reduced carbon dioxide ($CO_2$) emission. The exhaust from GDI and diesel engines contains excess amounts of oxygen ($O_2$). Although the oxidation of HC and CO are highly efficient with excess $O_2$, the removal of $NO_x$ components is of particular concern. This can be accomplished using a $NO_x$ adsorber.

SUMMARY OF THE INVENTION

Disclosed herein are catalyst configurations, a methods for making NOx adsorber catalysts, and a method for reducing emissions. In one embodiment, a catalyst configuration, comprises: a substrate, a NiO layer disposed on the substrate, wherein the NiO layer comprises greater than or equal to about 75 wt % of the NiO in the catalyst configuration; and a catalyst layer comprising a NOx adsorbing catalyst. In another embodiment, a catalyst configuration, comprises: a substrate, a catalyst layer disposed on the substrate, wherein the catalyst layer comprises a NOx adsorbing catalyst and thermally treated NiO.

In one embodiment, the method for making a NOx adsorber comprises: thermally treating NiO to a temperature of about a maximum catalyst application temperature minus 100° C. and the maximum catalyst application temperature, disposing a catalyst configuration on the substrate, wherein the catalyst configuration comprises the thermally treated NiO and a NOx adsorption catalyst, and disposing the substrate in a housing.

A method for reducing emissions comprises: contacting a gas stream with the catalyst configuration, oxidizing NO in the gas, adsorbing the oxidized NO, increasing a hydrocarbon concentration in the gas, converting the oxidized NO to $N_2$, and releasing the $N_2$.

The above-described and other features are exemplified by the following figures and detailed description.

BRIEF DESCRIPTION OF THE DRAWINGS

Referring now to the figures wherein the like elements are numbered alike.

DESCRIPTION OF THE PREFERRED EMBODIMENTS

Nickel oxide (NiO) may be employed in the NOx adsorber catalyst to reduce the hydrogen sulfide (H$_2$S) during the desulfation. (Typical desulfation condition includes: air/fuel ratio (A/F) of 12 to 14 in a temperature range of 650° C. to 800° C. A NOx adsorber can experience many such desulfation conditions in its lifecycle.) However, during such desulfation operation of the adsorber, the NiO can be reduced to its metallic state, Ni. Reaction of Ni with the catalyst (e.g., platinum group metals) results in the formation of undesirable alloys. Thereby, the catalytic function of the catalyst, e.g. the adsorption and reduction of the NOx, is degraded. It is therefore desirable to reduce the effects of NiO on the functions of precious metals, to improve catalyst thermal and sulfur resistant durability A catalyst configuration that is more resistant to sulfur poisoning and that is capable of maintaining the platinum group metal performance comprises NiO that is thermally treated and/or disposed in a fashion so as to minimize interaction between the NiO and the platinum group metal (s). Thermal treatment of the NiO lowers the chemical activity of the NiO, thereby reducing the extent of reactions between NiO and reductants. As a result, a lower percentage of the NiO is reduced to the metallic form. Since it is the metallic nickel that alloys with the platinum group metal(s), reduction in the amount of metallic nickel enables the maintenance of the catalyst activity.

Thermal treatment comprises heating the NiO in an environment comprising oxygen (e.g., air, oxygen, or the like), to a temperature of less than or equal to about the maximum catalyst application temperature (i.e., the highest temperature that will be experienced by the catalyst during use) for a sufficient period of time to inhibit reduction of the NiO to Ni during use while maintaining NiO's activity for hydrogen sulfide. Consequently, thermal treatment temperature is preferably controlled such that it is sufficiently high to inhibit the NiO reduction and interaction with precious metals and it is sufficiently low to prevent "over aging" that can reduce the NiO activity toward hydrogen sulfide suppression. Preferably, the NiO is heated to between the maximum catalyst application temperature and about 100° C. less than the maximum catalyst temperature (in real use situation, typically 800–850° C.). In other words, if the maximum catalyst application temperature is about 800° C., the NiO is preferably heated to about 700° C. to about 800° C. for about 30 minutes to about 20 hours or so, with heating to about 700° C. to about 750° C. for about 30 to about 300 minutes preferred. Preferably thermal treatment occurs prior to disposition of NiO onto/into the substrate, with prior to combining the NiO with other materials (e.g., solvent(s), metals, and the like) more preferred.

Figure 1:
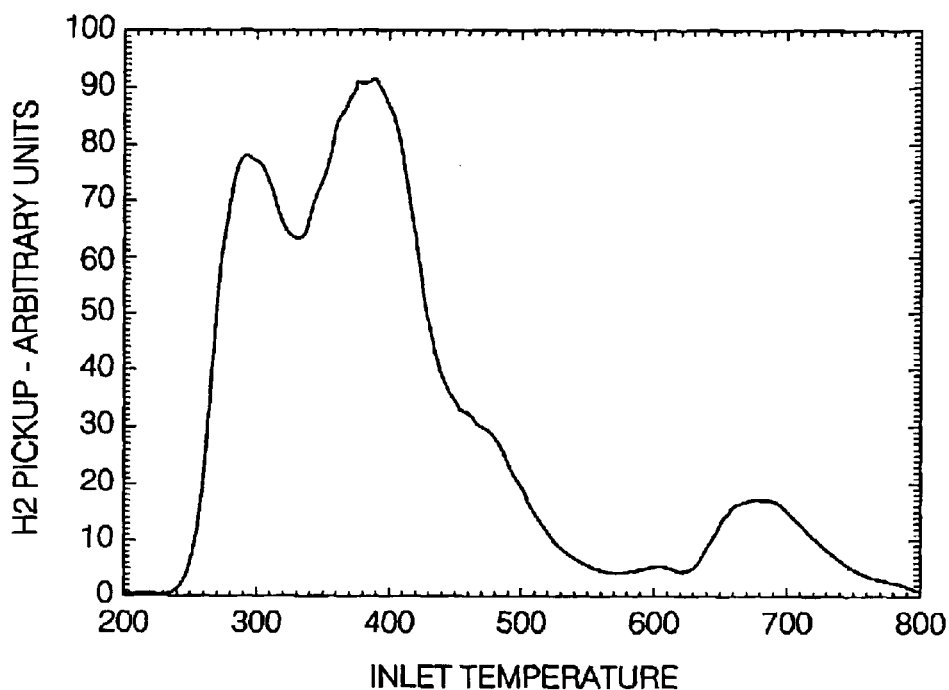
FIG. 1 is a graph showing reduction of NiO with $H_2$ over a range of temperatures.
Figure 2:
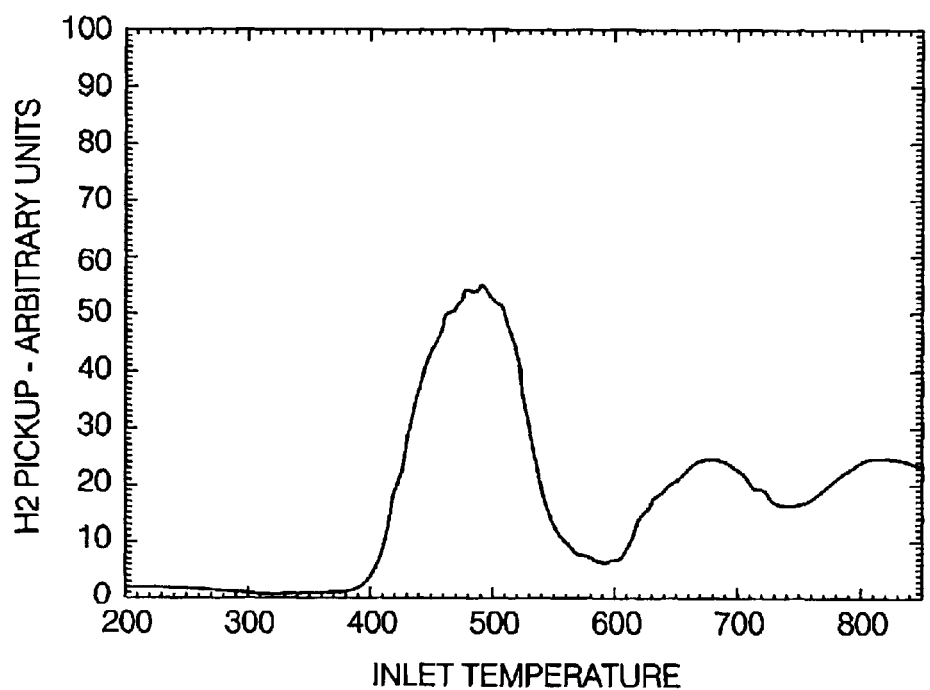
FIG. 2 is a graph showing reduction of thermally treated NiO with $H_2$ over a range of temperatures.

Thermally treating the NiO increases the NiO reduction temperature, i.e., the temperature at which the NiO reduces to metallic nickel. Referring to FIG. 1, the maximum reduction peak temperature of thermally untreated NiO is 370° C. In contrast, as set forth in FIG. 2, the maximum reduction peak temperature of the thermally treated NiO is 500° C., molar ratios of H$_2$/Ni of 1.6 for "non-thermally treated" NiO, indicating 100% of NiO is reduced by H$_2$ (a molar ratio of 1 is expected based on stoichiometry). Higher than stoichiometric amount of H$_2$ consumed may be due to some H$_2$ storage on Ni metal) and of 0.6 for "thermally treated" NiO indicating NiO is only partially reduced to NiO metal.

The NiO, treated or untreated, can be employed in a catalyst configuration that inhibits interaction of the NiO and the platinum group metal(s). Preferably, the NiO layer is disposed on with a catalyst layer disposed on a side of the NiO layer opposite the substrate. Optionally, the catalyst layer can comprise two portions, an underlayer disposed on a side of the NiO-containing layer opposite the substrate and an overlayer disposed on a side of the underlayer opposite the NiO-containing layer. The NiO layer can be disposed on the substrate by wash coating, imbibing, impregnating, physisorbing, chemisorbing, spraying, dipping, painting, coating, precipitating, or otherwise applying it to the substrate.

The amount of NiO in the NiO layer is dependent upon the amount of sulfur in the stream to be treated and amount of sulfur stored on the catalyst and $H_2S$ to be formed if NiO is absent during desulfation. The amount of NiO is further determined by the amount of space in the washcoat available for the NiO, and the frequency of the NOx trap regenerations (the greater the regeneration frequency, the lower the amount of NiO needed to obtain the same results).

The substrate can comprise any material designed for use in a spark ignition or diesel engine environment, and have the following characteristics: capable of operating at temperatures up to about 1,000° C.; capable of withstanding exposure to hydrocarbons, nitrogen oxides, carbon monoxide, carbon dioxide, sulfur and/or sulfur oxides; and having sufficient surface area and structural integrity to support the desired catalyst. Some possible materials include cordierite, ceria, silicon carbide, metal, alumina, glasses, and the like, and mixtures comprising at least one of the foregoing materials. The materials can be in various forms, including foils, perform, mat, fibrous material, monoliths (e.g., a honeycomb structure, and the like), other porous structures (e.g., porous glasses, sponges, foams, and the like), pellets, particles, molecular sieves, and the like (depending upon the particular device), and combinations comprising at least one of the foregoing forms, e.g., metallic foils, open pore alumina sponges, and porous ultra-low expansion glasses.

Although the catalyst substrate can have any size or geometry, the size and geometry are preferably chosen to optimize surface area in the given catalytic converter design parameters. Typically, the catalyst substrate has a honeycomb geometry, with the combs being any multi-sided or rounded shape, with substantially square, triangular, hexagonal, or similar geometries preferred due to ease of manufacturing and increased surface area.

The catalyst layer, which can be disposed on a side of the NiO layer opposite the substrate by wash coating, imbibing, impregnating, physisorbing, chemisorbing, spraying, dipping, coating, precipitating, or otherwise, preferably comprises a NOx catalyst. The catalyst can comprise a material such as platinum, palladium, rhodium, iridium, osmium, ruthenium, tantalum, zirconium, yttrium, cerium, aluminum, nickel, copper, and the like, as well as oxides, alloys, cermets, and combinations comprising at least one of the foregoing materials. Optionally the NOx catalyst can be postimpregnated into the catalyst layer. A preferred catalyst comprises platinum since it functions to oxidize nitric oxide (NO) to generate nitrogen dioxide ($NO_2$), and palladium to enhance light-off and low temperature $NO_x$ conversions. In one embodiment, the catalyst can comprise about 10 $g/ft^3$ to about 200 $g/ft^3$ of platinum and about 0.5 to about 30 $g/ft^3$ of rhodium, with about 10 $g/ft^3$ to about 150 $g/ft^3$ of platinum, about 1 to about 100 $g/ft^3$ of palladium, and about 1 to about 30 $g/ft^3$ of rhodium preferred. Preferably, the catalyst comprises about 30 $g/ft^3$ to about 100 $g/ft^3$ platinum, about 5 $g/ft^3$ to about 60 $g/ft^3$ palladium, and about 2 $g/ft^3$ to about 15 $g/ft^3$ rhodium.

The catalyst layer can comprise multiple portions. For example, the catalyst layer can comprise an underlayer disposed on a side of the NiO layer opposite the substrate, and overlayer disposed on a side of the underlayer opposite the NiO layer, both of which can be disposed by any of the methods set forth above. If multiple layers are employed, the compositions of these layers can be controlled to improve NOx adsorption and conversion. For example, the underlayer can comprise greater than or equal to about 75 wt % of the rhodium in the catalyst layer, while the overlayer can comprise the balance of the rhodium in the catalyst layer. It is preferred that the underlayer comprises greater than or equal to about 90 wt % of the rhodium in the catalyst layer, with greater than or equal to about 95 wt % more preferred, and greater than or equal to about 97 wt % even more preferred. It is especially preferred that the underlayer be free of Pd and the overlayer be free of Rh, wherein free means less than about 1 wt % based upon the total weight of that material in the catalyst configuration. It is also preferred that Pt be present in both underlayer and overlayer.

The catalyst layer can further comprise a trapping material effective in the storage of nitrogen oxides. Possible trapping materials include carbonates such as barium carbonate, potassium carbonate, and the like, as well as combinations comprising at least one of the foregoing trapping materials. During operation, sulfur poisoning occurs and the trapping materials such as $BaCO_3$ and $K_2CO_3$ are converted to $BaSO_4$ and $K_2SO_4$, respectively. Thereby their overall NOx trapping performance is reduced. During desulfation, the catalyst configurations are subject to hot rich conditions, typically at temperatures above 700° C. with an A/F ratio of about 14/11, to restore the NOx storage capacity of the trapping materials. Negative interaction of NiO and the precious metals under hot rich conditions and NiO's ability to retain sulfur during hot rich desulfation conditions leads the NOx adsorber to severely de-activate with NiO throughout the catalyst layer (i.e., in both underlayer and overlayer; NiO uniformly in washcoat with precious metals).

Figure 3:
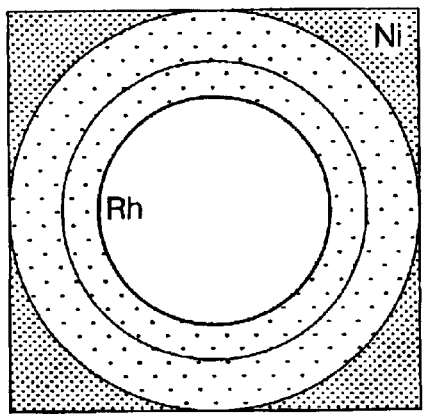
FIG. 3 shows an adsorber catalyst configuration with a NiO-containing layer disposed between the substrate and the underlayer.
Figure 4:
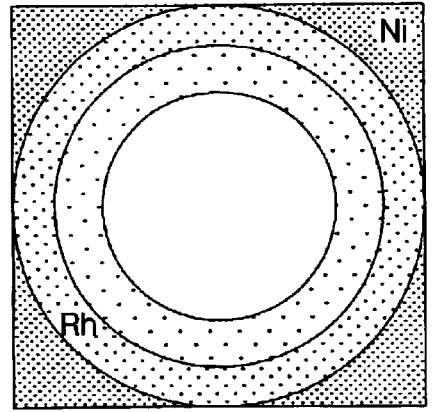
FIG. 4 shows an adsorber catalyst configuration with an NiO-containing layer disposed between the substrate and the underlayer and wherein the rhodium is substantially disposed in the underlayer, thereby reducing the number of steps to form the catalyst.
Figure 5:
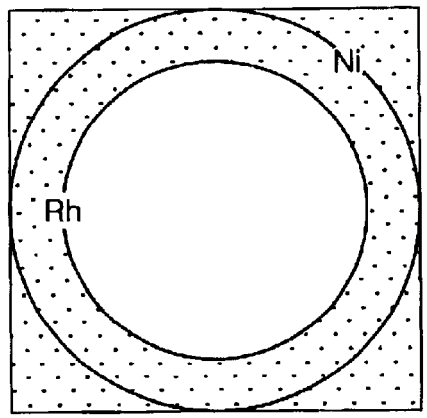
FIG. 5 shows an adsorber catalyst configuration with a NiO-containing layer disposed between the overlayer and the underlayer.
Figure 6:
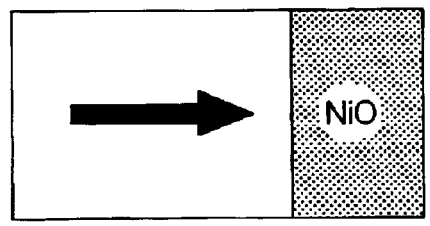
FIG. 6 shows an adsorber catalyst configuration with a NiO-containing layer comprising a band axial to the direction of flow.

In designs as illustrated in FIGS. 3 and 4, the NiO layer can preferably be disposed between the substrate and the underlayer. Alternatively, as illustrated in FIG. 5, the NiO-containing layer can be disposed between the overlayer and the underlayer. In yet another alternative, illustrated in FIG. 6, the NiO layer can be disposed "downstream" of at least a portion of the catalyst layer. In other words, the NiO layer can be disposed along a portion of the substrate, e.g., in the form of a band or otherwise, such that the NOx containing stream contacts the catalyst layer prior to contacting the NiO-containing layer. In this configuration, the NiO-containing layer is positioned axial to the direction of flow, thereby limiting the interface between the NiO layer and the catalyst layer and maintaining a larger amount of catalyst activity.

In another alternative embodiment, the palladium can be disposed to avoid interaction with Rh. In this embodiment, the underlayer comprises less than or equal to about 25 wt % of the palladium in the catalyst layer, while the overlayer can comprise the balance of the palladium in the catalyst layer. It is preferred that the overlayer comprises greater than or equal to about 90 wt % of the palladium in the catalyst layer, with greater than or equal to about 95 wt % more preferred, and greater than or equal to about 97 wt % even more preferred. In this embodiment, the underlayer can comprise a combination of platinum and rhodium, while the overlayer can comprise platinum and palladium, wherein the underlayer contains part or all of the rhodium to inhibit the negative interaction between palladium and rhodium.

Figure 7:
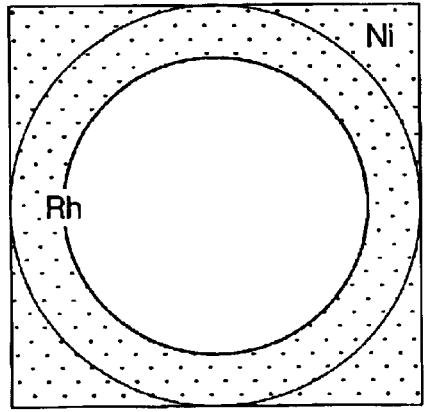
FIG. 7 shows an adsorber catalyst configuration with NiO disposed primarily in the underlayer.
Figure 8:
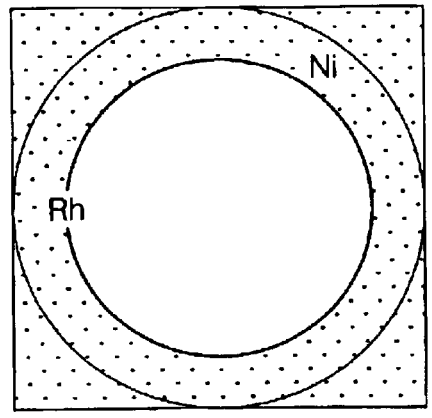
FIG. 8 shows an adsorber catalyst configuration with NiO disposed primarily in the overlayer.
Figure 9:
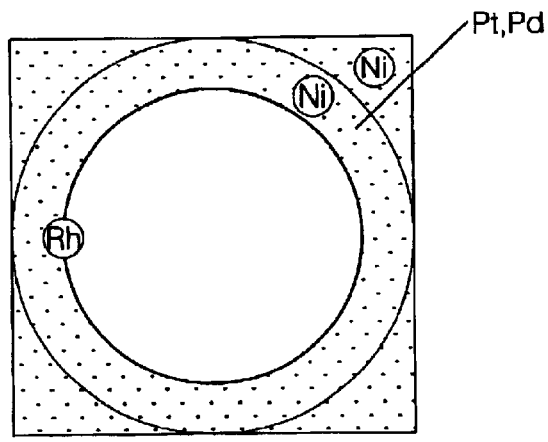
FIG. 9 shows an adsorber catalyst configuration with NiO disposed in the overlayer and the underlayer.

Although it is preferable to dispose the NiO in a separate NiO layer to obtain maximum benefits, some benefit may be obtained by disposing the NiO in the overlayer or in the underlayer, as is shown in FIGS. 7 and 8. In FIG. 7, the NiO is disposed primarily in the underlayer. In FIG. 8 the NiO is disposed primarily in the overlayer. In both of these configurations, the interaction of the catalyst with NiO is reduced to where about half of the catalyst is in contact with NiO. Because while the catalyst are disposed in both the underlayer and the overlayer, NiO is disposed primarily in only one of the two layers. Thereby, a greater amount of catalyst deactivation can be prevented, as compared to configurations wherein the NiO is disposed in both the overlayer and the underlayer (i.e., throughout the catalyst layer), as is shown in FIG. 9.

The catalyst configuration described above can be disposed in a housing with a retention material (e.g., an intumescent or non-intumescent material such as those used with catalytic converters) optionally disposed between the housing and the substrate. During use, a gas stream would be introduced to the catalyst configuration through one end of the housing. NOx in the gas stream would be oxidized to $NO_2$ and adsorbed. During NOx regeneration when A/F ratio is less than 14.56, the excess reductants from the engine convert stored NOx to $N_2$ that is released. During this process, sulfur species in the gas stream (SOx) would also be oxidized and adsorbed by the trapping elements. Upon desulfation they would be released as $H_2S$.

The invention is further illustrated by the following non-limiting examples.

EXAMPLE 1

Figure 10:
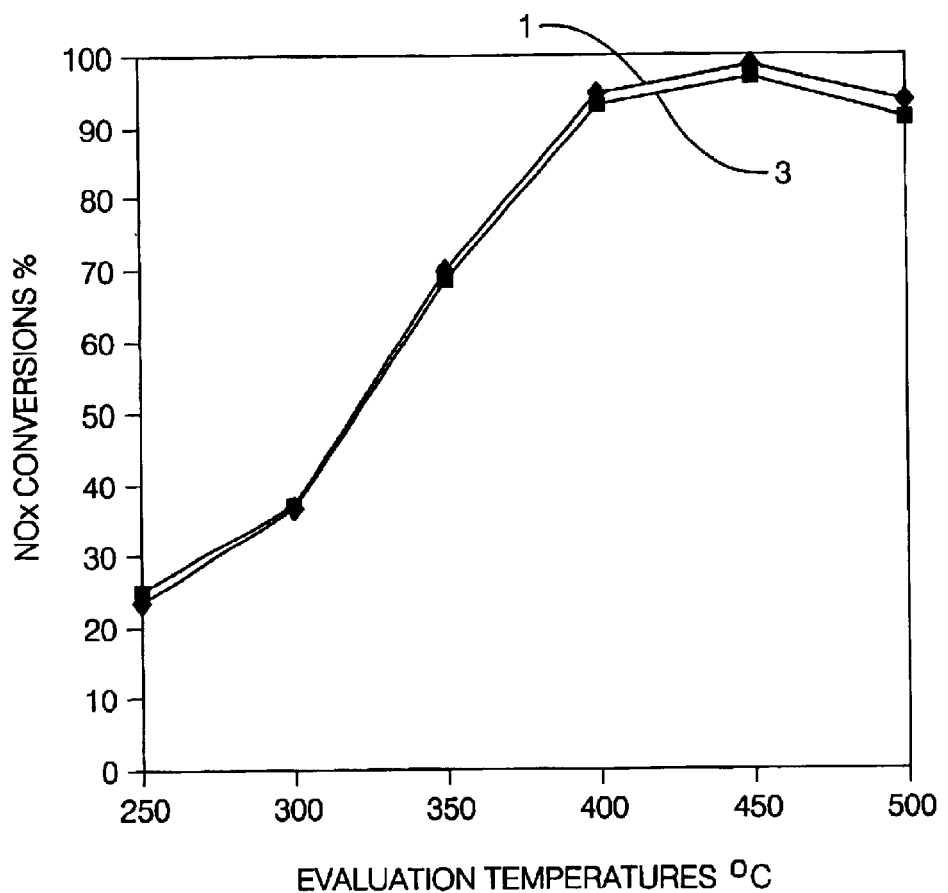
FIG. 10 is a graph showing $NO_x$ performance for fuel cut aged adsorber catalyst configurations with NiO disposed in the overlayer and underlayer, and configurations without NiO.
Figure 11:
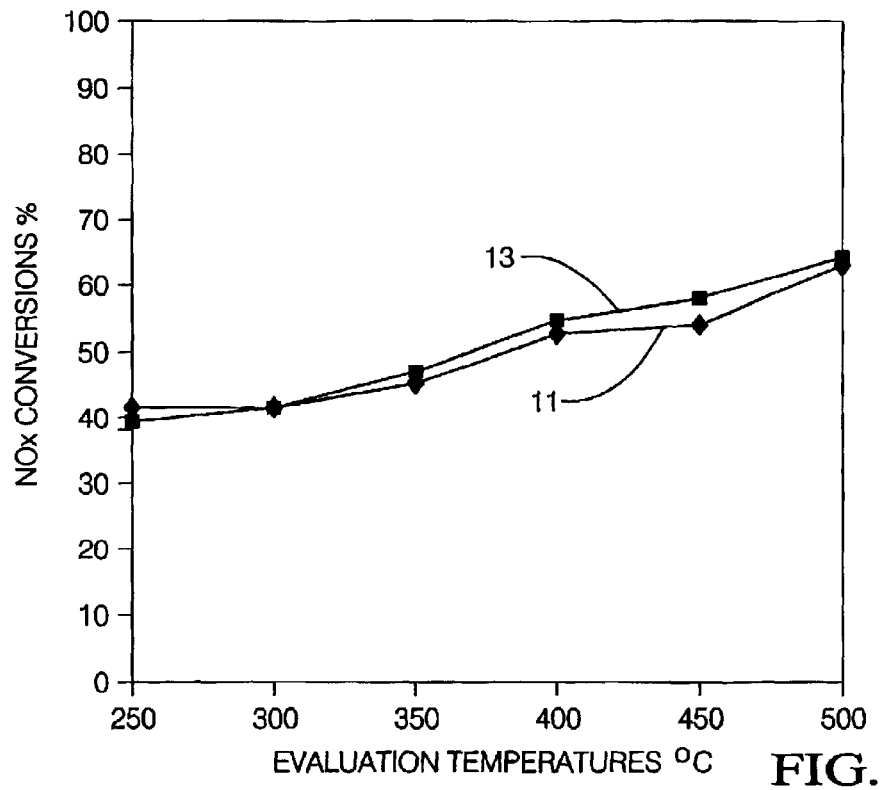
FIG. 11 is a graph showing HC performance for fuel cut aged adsorber catalyst configurations with NiO disposed in the overlayer and underlayer, and configurations without NiO.
Figure 12:
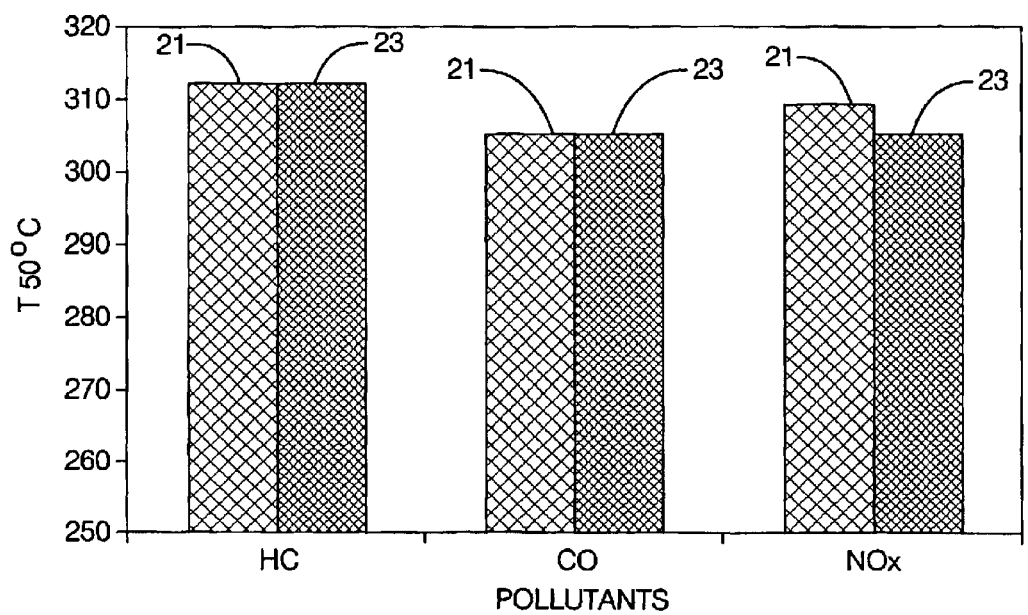
FIG. 12 is a graph showing light off performance for fuel cut aged adsorber catalyst configurations with NiO disposed in the overlayer and underlayer, and configurations without NiO.
Figure 13:
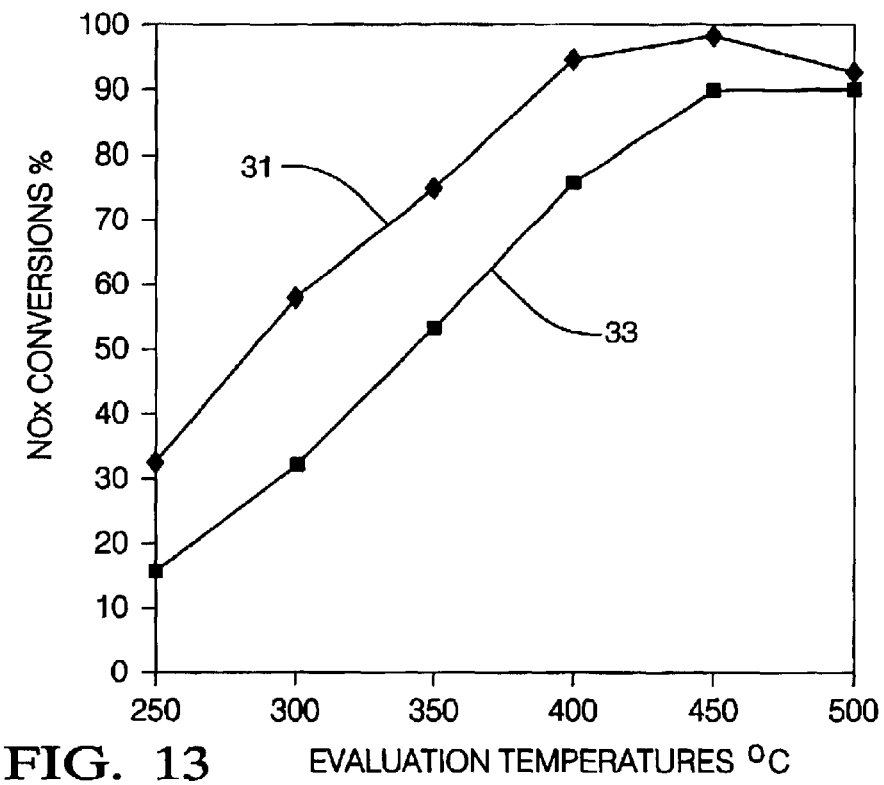
FIG. 13 is a graph showing $NO_x$ performance for lean/rich aged adsorber catalyst configurations with NiO disposed in the overlayer and underlayer, and configurations without NiO.
Figure 14:
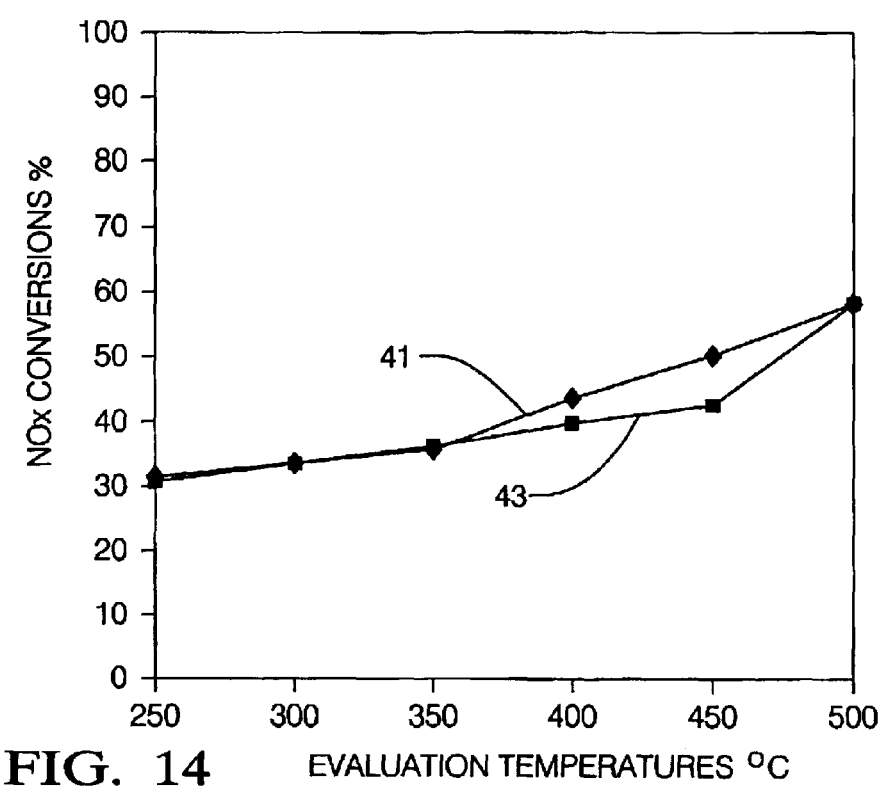
FIG. 14 is a graph showing HC performance for lean/rich aged adsorber catalyst configurations with NiO disposed in the overlayer and underlayer, and configurations without NiO.
Figure 15:
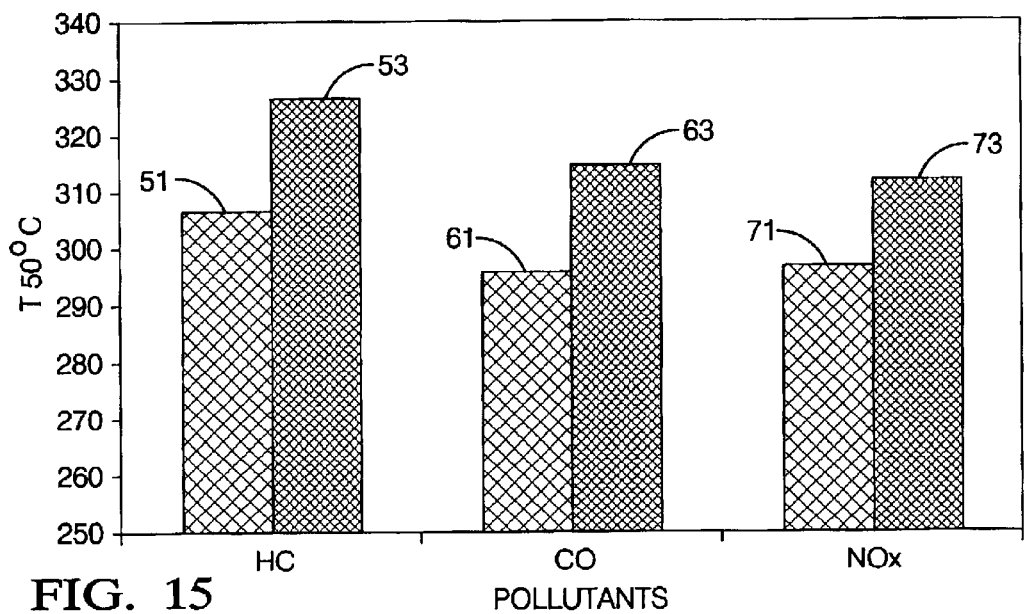
FIG. 15 is a graph showing light off performance for lean/rich aged adsorber catalyst configurations with NiO disposed in the overlayer and underlayer, and configurations without NiO.

Catalyst configurations with NiO disposed in the catalyst layer and configurations without NiO were compared. The configurations were aged for 50 hours on a fuel cut cycle (i.e., during the aging, the fuel is periodically cut off to create a super $O_2$ rich exhaust) with maximum bed temperature of 800° C., and then tested under lean/rich modulations at different temperatures. According to the graphs in FIGS. 10, 11, and 12, catalyst configurations with NiO (3, 13, 23, respectively) exhibited similar $NO_x$, HC, and light off performance as compared to configurations without NiO (1, 11, 21, respectively), when the catalyst configurations were subjected to fuel cut aging. However, when the same catalyst configurations were subjected to lean/rich modulation aging at 800° C. for 20 hours, $NO_x$ performance for configurations without NiO (line 31) was significantly better than configurations with NiO (line 33). (See FIG. 13) HC performance was also slightly better for the configurations without NiO (line 41) versus with NiO (line 43), as is shown in FIG. 14. Further, FIG. 15 shows that configurations without NiO (51, 61, 71) have better light off performance than configurations with NiO (53, 63, 73).

Figure 16:
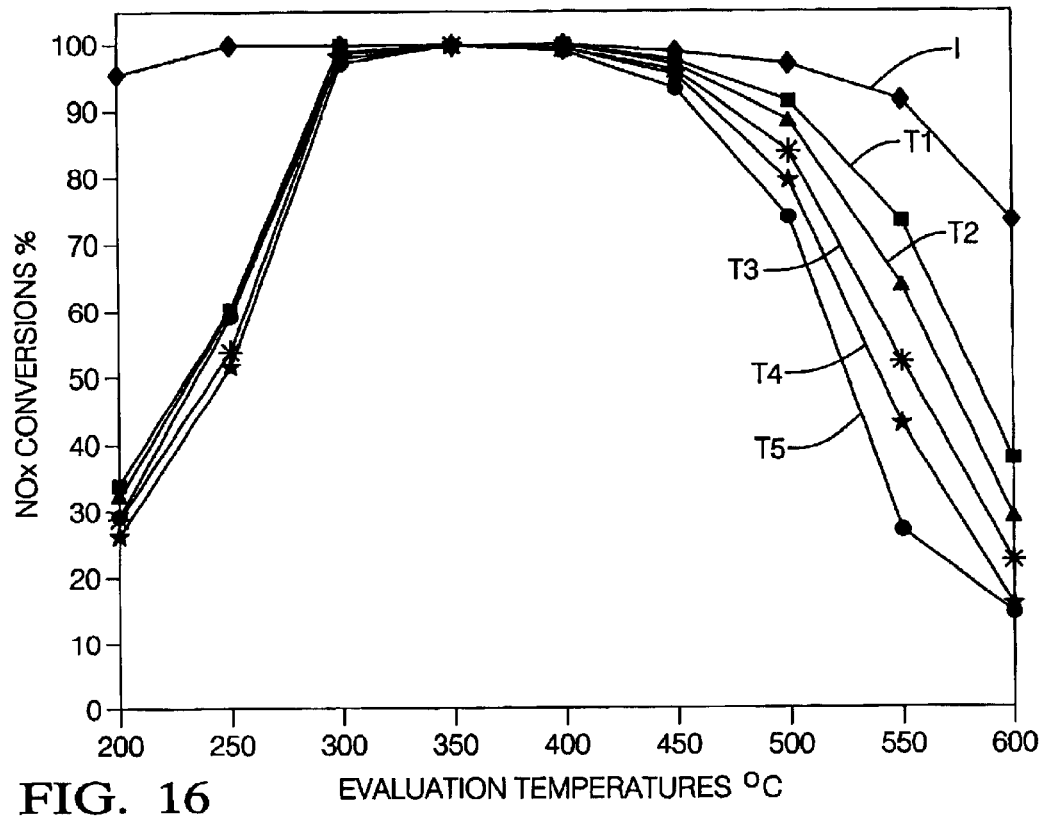
FIG. 16 is a graph showing $NO_x$ performance for adsorber catalyst configuration without NiO, subjected to repeated hot rich treatments.
Figure 17:
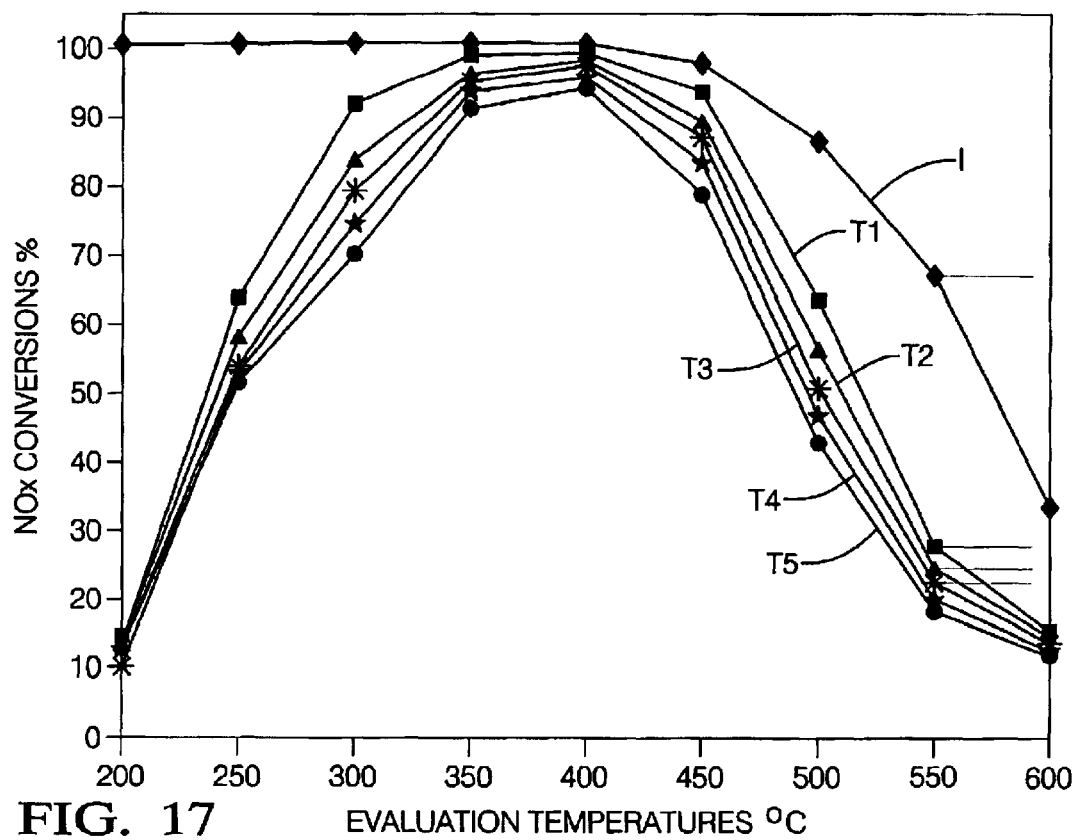
FIG. 17 is a graph showing $NO_x$ performance for adsorber catalyst configuration with NiO disposed in the overlayer and the underlayer, subjected to repeated hot rich treatments.

To further test the hypothesis that hot fuel rich conditions and NiO reduction are the causes of catalyst deactivation, configurations with NiO disposed in the catalyst layer (FIG. 17), and configurations without NiO (FIG. 16) were each subjected to five repeat fuel rich treatments with an air/fuel (A/F) of 12.5 at 800° C. for one hour. After each rich treatment, a lean/rich modulation test was performed to evaluate the catalyst performance. As is shown in FIGS. 16 and 17, configurations with NiO deactivate faster than configurations without NiO, when subjected to repeat fuel rich treatments. In both of these figures, "I" is the initial test, followed by T1, T2, T3, T4, and T5.

EXAMPLE 2

Figure 18:
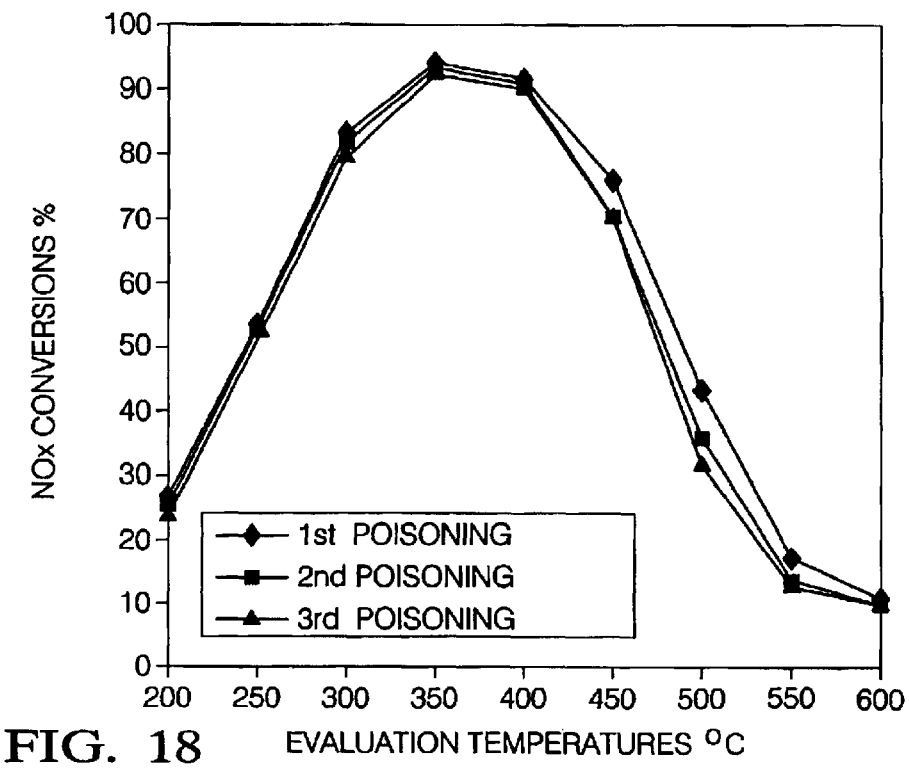
FIG. 18 is a graph showing $NO_x$ performance for adsorber catalyst configuration without NiO, subjected to repeated sulfur poisoning.
Figure 19:
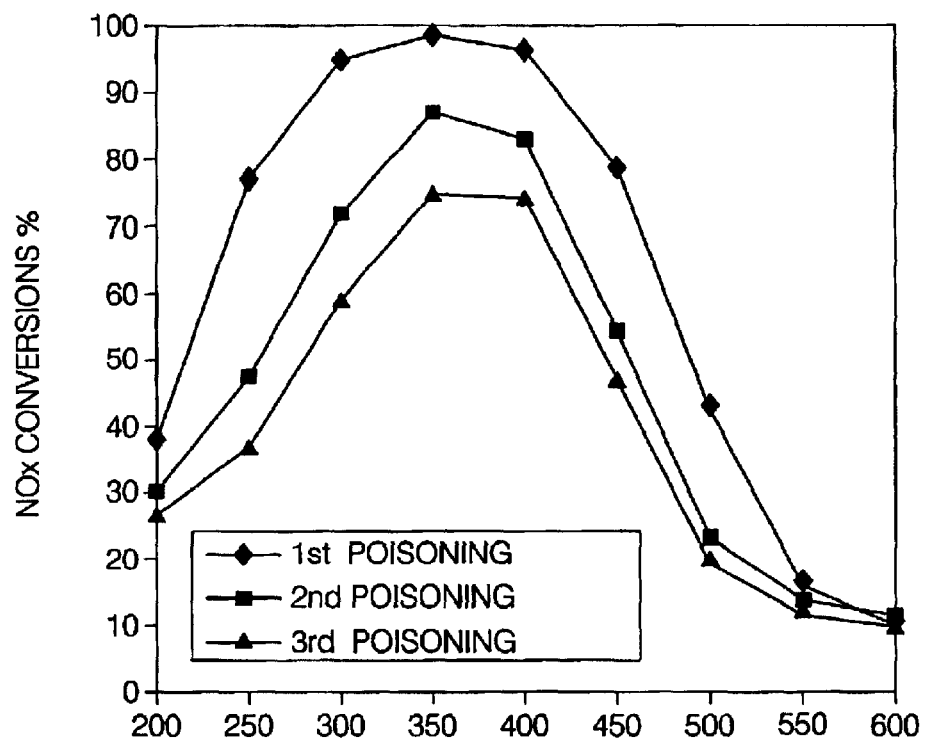
FIG. 19 is a graph showing $NO_x$ performance for adsorber catalyst configuration with NiO disposed in the underlayer and overlayer, subjected to repeated sulfur poisoning.
Figure 20:
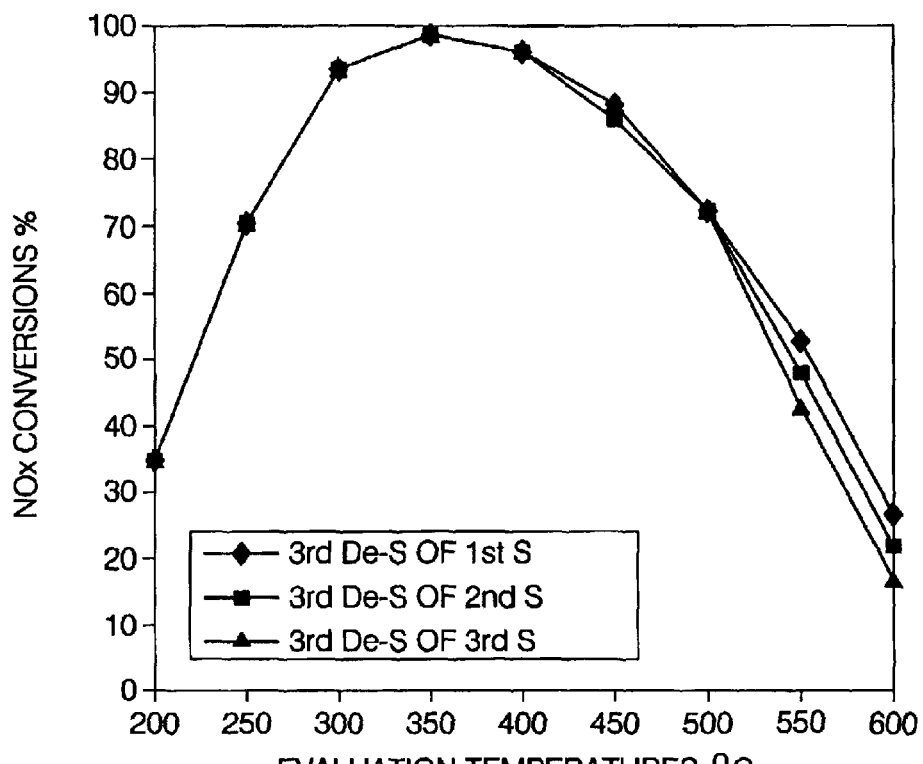
FIG. 20 is a graph showing $NO_x$ performance for adsorber catalyst configuration without NiO, subjected to repeated desulfations.
Figure 21:
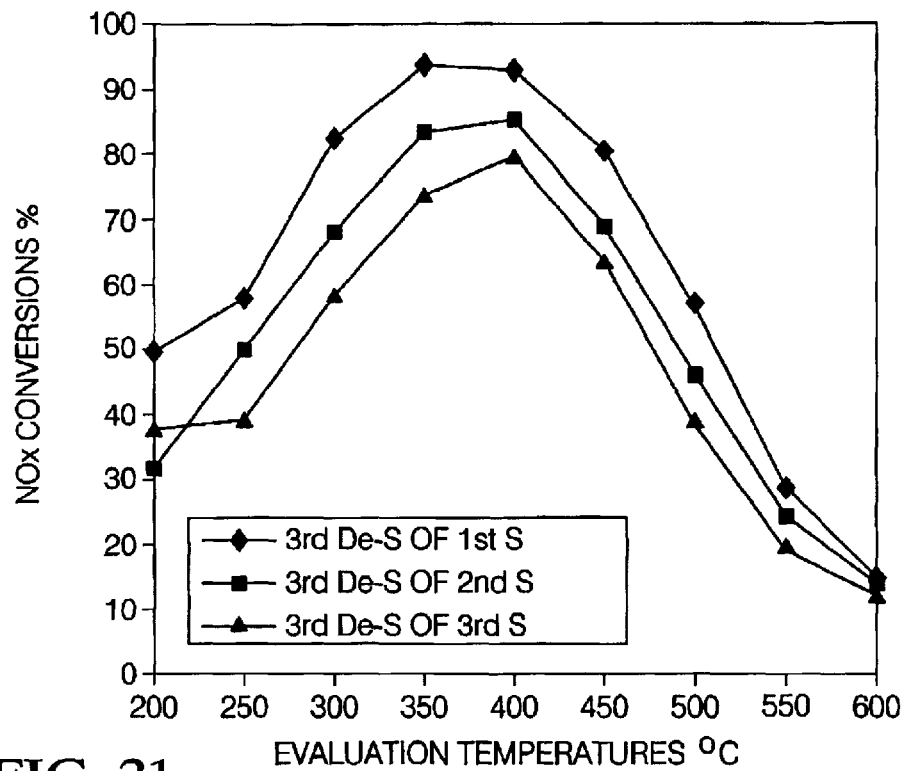
FIG. 21 is a graph showing $NO_x$ performance for adsorber catalyst configuration with NiO disposed in the underlayer and the overlayer, subjected to repeated desulfations.

To test the effects of NiO on catalyst performance after sulfur poisoning and desulfation, both configurations with NiO disposed in the catalyst layer, and configurations without NiO were preconditioned at 700° C. for five hours and then subjected to repeated sulfur poisoning and desulfation. As is shown in FIGS. 18 and 19, the $NO_x$ performance of configurations without NiO (FIG. 18) is significantly better than configurations with NiO (FIG. 19) after 3 repeated sulfur poisonings. Desulfation was performed at 700° C. with an A/F of 13 for 7.5 minutes following sulfur poisoning at 550° C. for 5 hours with 20 ppm $SO_2$. FIGS. 20 and 21 show that the $NO_x$ performance of configurations without NiO (FIG. 20) is significantly better than configurations with NiO (FIG. 21, after repeated sulfur desulfations).

NiO reacts with $H_2S$ to form NiS, subsequently, certain portions of sulfur could be retained on the NOx adsorber even after desulfation with 700° C. and A/F=13. To quantify the effects of NiO on trapping sulfur after desulfation, configurations with NiO disposed in the catalyst layer, and configurations without NiO were analyzed for residual sulfur. The results are highlighted in Table 1 below. The relative molar ratios of residual sulfur to sulfur trapping material (in this case barium (Ba)) were calculated based on the weight percent of sulfur and the weight percent of Ba in the configurations. As is shown in Table 1, the amount of residual sulfur detected in the configuration with NiO was 0.25 wt %, which is equivalent to 27.2% of Ba sites, as compared to the configuration without NiO, which was not measurable.

TABLE 1

| Configuration | Amount of residual sulfur | Number of Ba sites |
| --- | --- | --- |
| Without NiO | less than 0.046% (below detection) | 3.9% |
| With NiO | 0.25% | 27.2% |

Hence, Table 1 shows that configurations with NiO throughout the catalyst layer are more sensitive to sulfur poisoning and less effective at recovering $NO_x$ performance upon desulfation.

EXAMPLE 3

Four catalyst configurations were prepared. In the first configuration, NiO was disposed primarily in the underlayer. In the second configuration, NiO was disposed in a NiO layer disposed overlayer. In the third configuration, NiO was disposed in a NiO layer disposed between the substrate and the underlayer. In the fourth configuration, as a control, NiO was disposed throughout the catalyst layer. All catalyst configurations were prepared with a precious metal loading of 85 g/ft³, comprising 60 g/ft³ Pt, 20 g/ft³ Pd, and 5 g/ft³ Rh. All catalysts were then aged under lean/rich conditions for 20 hours.

Figure 22:
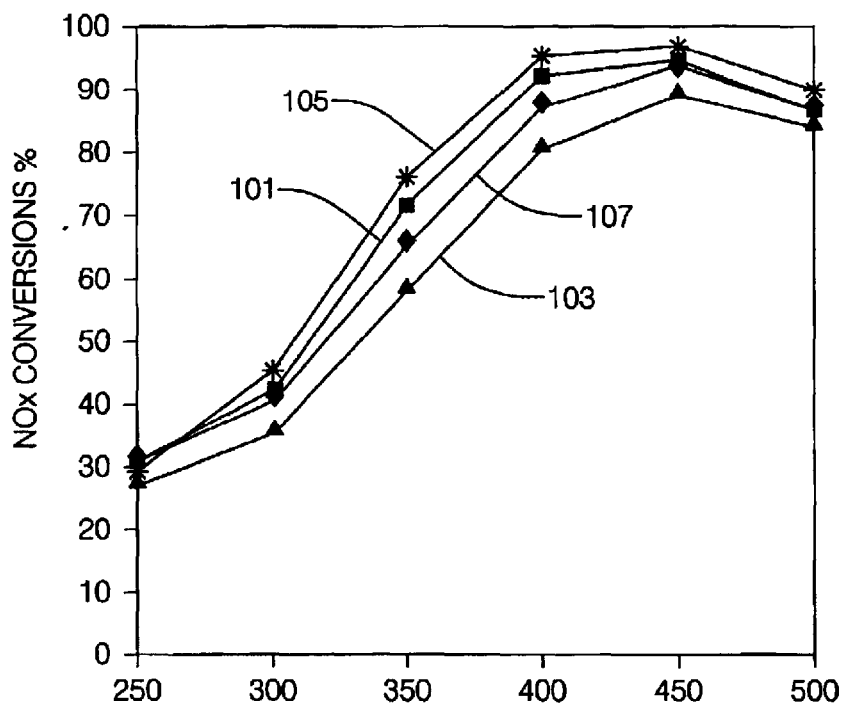
FIG. 22 is a graph showing NO$_x$ performance for lean/rich aged adsorber catalyst configurations with NiO disposed in the overlayer and underlayer, primarily in the underlayer, primarily in the overlayer, or in an NiO-containing layer disposed between the substrate and the underlayer.
Figure 23:
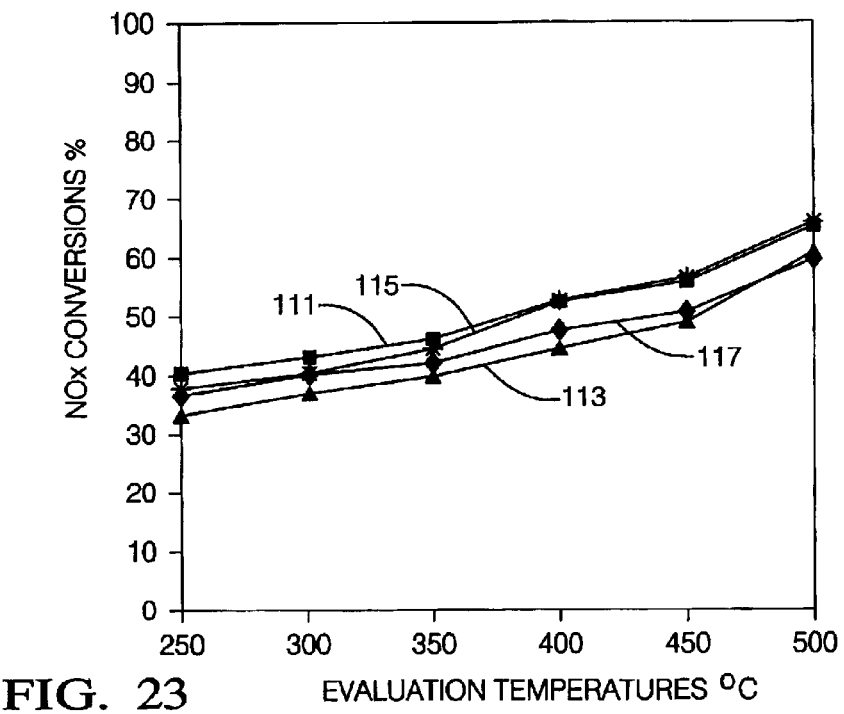
FIG. 23 is a graph showing HC performance for lean/rich aged adsorber catalyst configurations with NiO disposed in an overlayer and underlayer, primarily in the underlayer, primarily in the overlayer, or in an NiO-containing layer disposed between the substrate and the underlayer.
Figure 24:
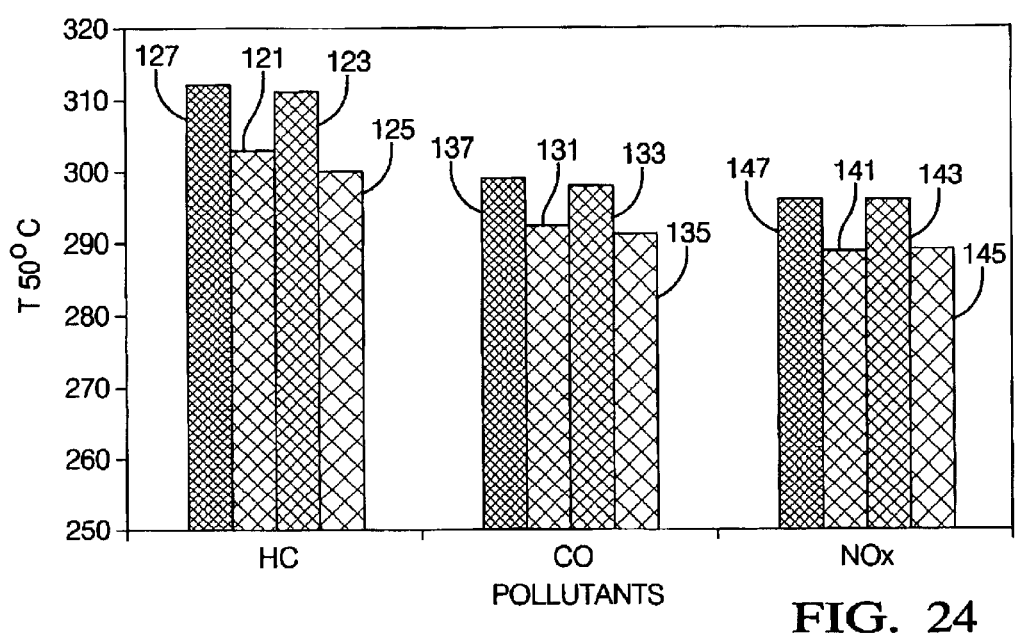
FIG. 24 is a graph showing light off performance for lean/rich aged adsorber catalyst configurations with NiO disposed in the overlayer and underlayer, primarily in the underlayer, primarily in the overlayer, or in an NiO-containing layer disposed between the substrate and the underlayer.

The catalyst configurations were aged under lean/rich modulation condition at 800° C. for 20 hours. FIGS. 22 and 23, respectively, show the $NO_x$ and HC performance of the four catalyst configurations. FIGS. 22 and 23 clearly show that the first (lines 101 and 111) and third configurations (lines 105 and 115), unexpectedly exhibit better performance than the second configuration (lines 103 and 113) and the fourth configuration (lines 107 and 117), the control. FIG. 24 shows that the first and third configurations (lines 121, 131, and 141; and lines 125, 135, and 145, respectively) also unexpectedly exhibit better light off performance than does the control configuration (lines 127, 137, and 147). Additionally, FIGS. 22 and 23 show that the second configuration (lines 103 and 113), wherein NiO disposed in the overlayer performs worse than the control (lines 107 and 117).

Figure 25:
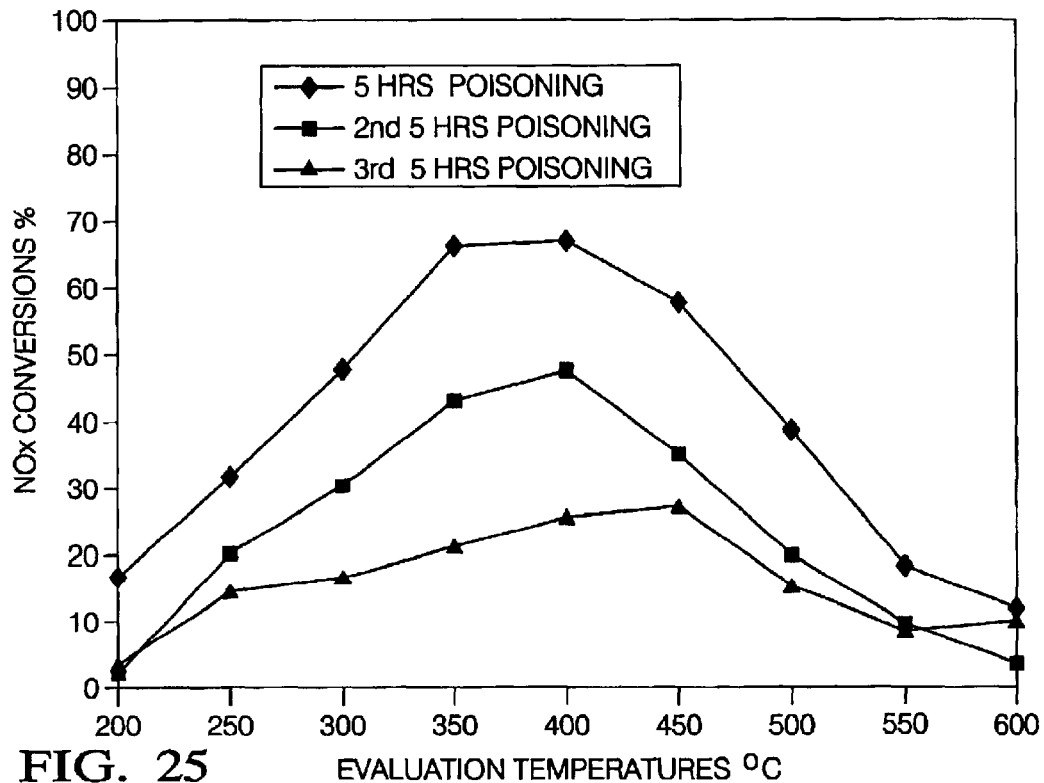
FIG. 25 is a graph showing NO$_x$ performance for adsorber catalyst configurations with NiO disposed in the overlayer and underlayer subjected to repeated sulfur poisoning.
Figure 26:
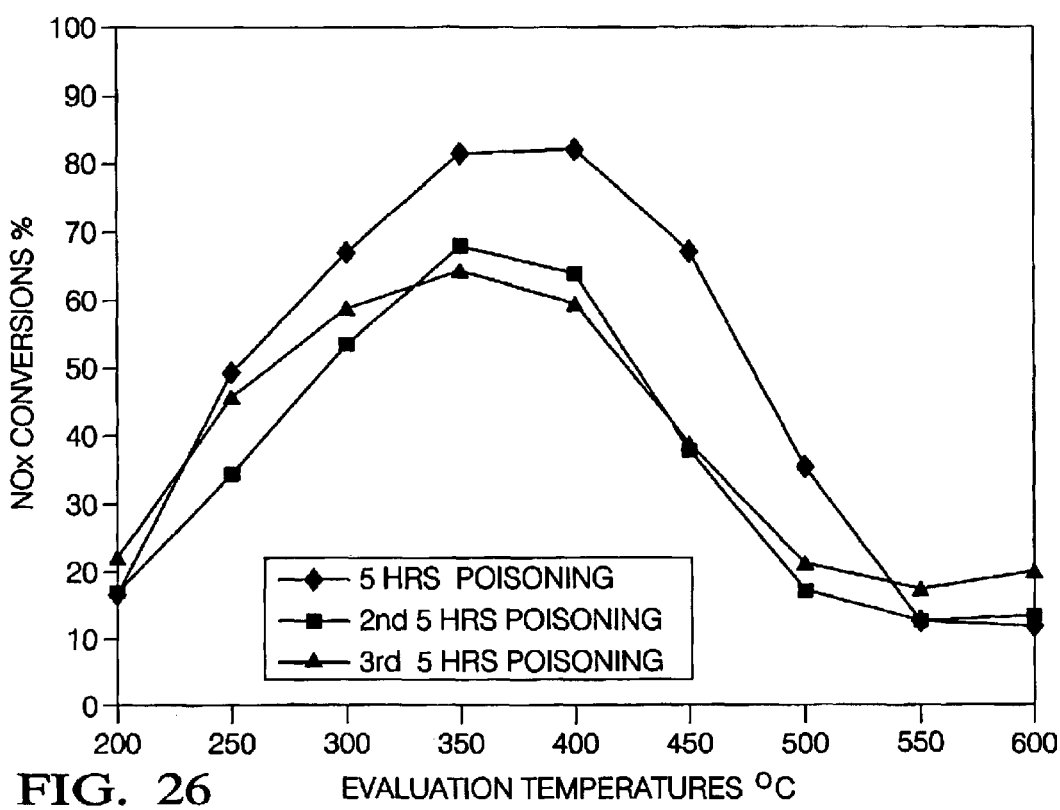
FIG. 26 is a graph showing NO$_x$ performance for adsorber catalyst configurations with NiO disposed in a NiO-containing layer disposed between the substrate and the underlayer subjected to repeated sulfur poisoning.
Figure 27:
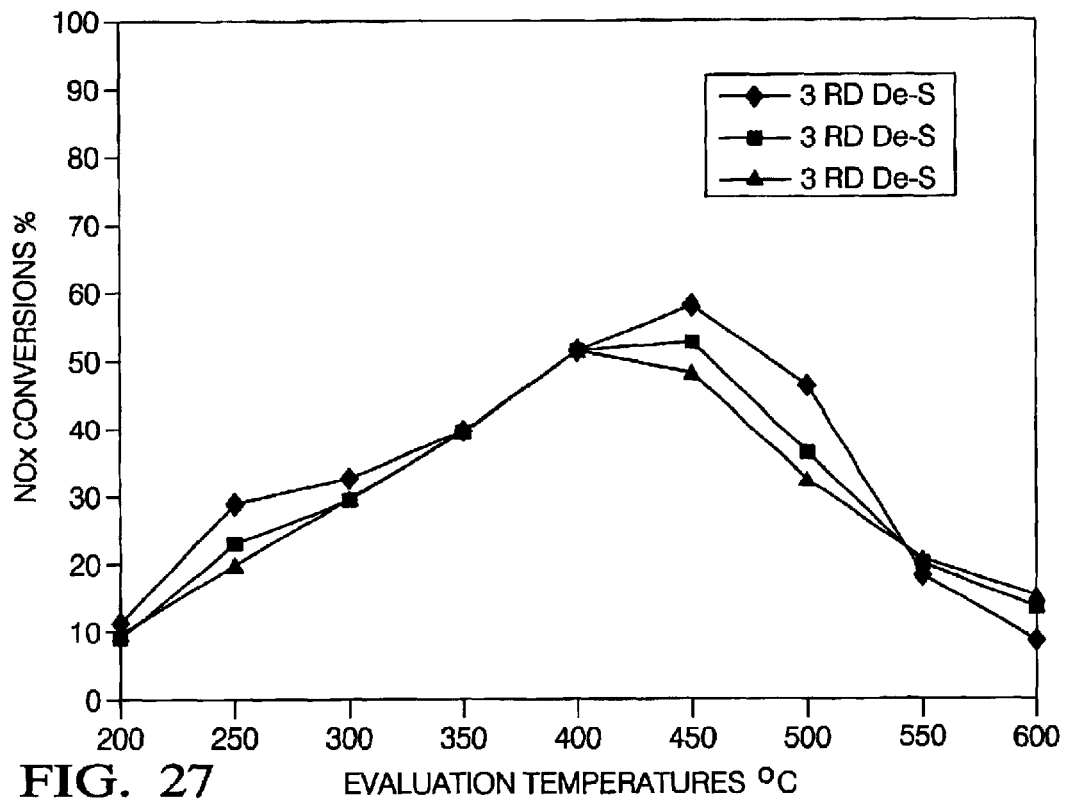
FIG. 27 is a graph showing NO$_x$ performance for adsorber catalyst configurations with NiO disposed in the overlayer and underlayer subjected to repeated desulfations.
Figure 28:
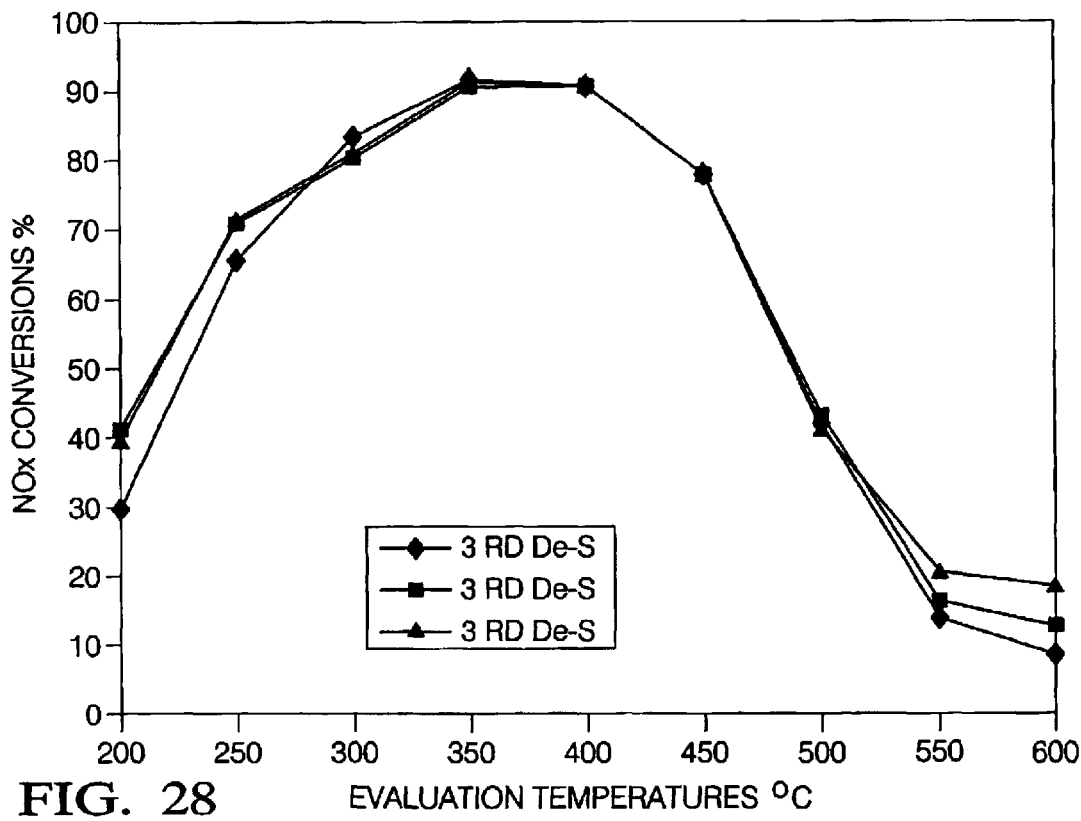
FIG. 28 is a graph showing NO$_x$ performance for adsorber catalyst configuration with NiO disposed in a NiO-containing layer disposed between the substrate and the underlayer subjected to repeated desulfations.

The effects of sulfur poisoning and desulfation on the performance of the catalyst configurations were also tested. The third catalyst configuration, wherein NiO was disposed in a NiO layer between the substrate and the underlayer and the fourth configuration, the control, were subjected to repeated sulfur poisonings with 20 ppm $SO_2$ at 550° C. for 5 hours with desulfations conducted at 700° C. A/F of 13 for 7.5 minutes before each poisoning. FIG. 25 shows that the fourth configuration, the control, exhibits poor performance after repeated sulfur poisonings when compared with the third configuration, which is shown in FIG. 26. Similarly, FIG. 27 shows that the fourth configuration, the control, exhibits poor performance after repeated desulfations when compared with the third configuration, which is shown in FIG. 28.

EXAMPLE 4

Again, four catalyst configurations were prepared. In the first configuration, the control, non-thermally treated NiO was disposed throughout the catalyst layer. In the second configuration, thermally treated NiO was disposed throughout in the catalyst layer. Thermal treatment was conducted at 750° C. for 2 hours. In the third configuration, NiO was disposed primarily in the underlayer. In the fourth configuration, an NiO-containing layer was disposed between the substrate and the underlayer, and the catalyst were segregated within the overlayer and the underlayer, such that Rh was disposed primarily in the underlayer, and Pd is disposed primarily in the overlayer. All catalyst configurations prepared had the catalyst loadings of 85 g/ft$^3$, comprising 60 g/ft$^3$ Pt, 20 g/ft$^3$ Pd, and 5 g/ft$^3$ Rh.

Figure 29:
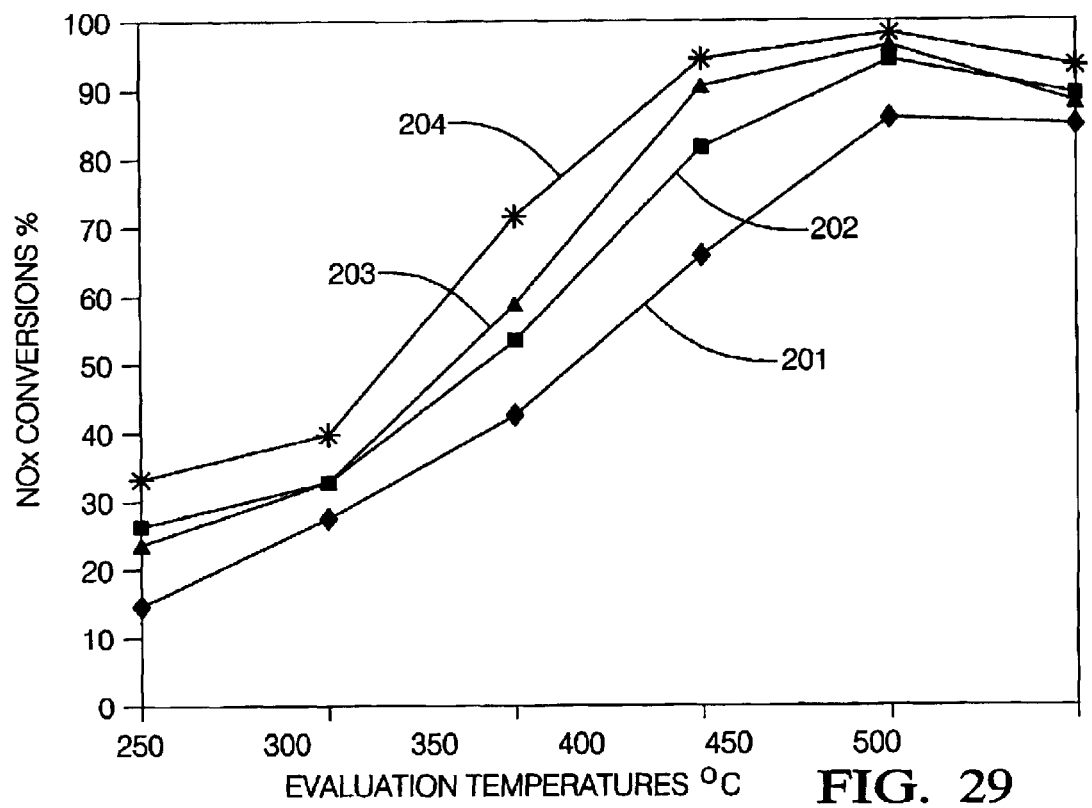
FIG. 29 is a graph showing NO$_x$ performance for adsorber catalyst configurations with NiO disposed in the overlayer and underlayer, thermally treated NiO disposed in the overlayer and underlayer, NiO disposed primarily in the underlayer, NiO disposed in an NiO-containing layer disposed between the substrate and the underlayer and wherein platinum group metals are segregated within the overlayer and the underlayer.
Figure 30:
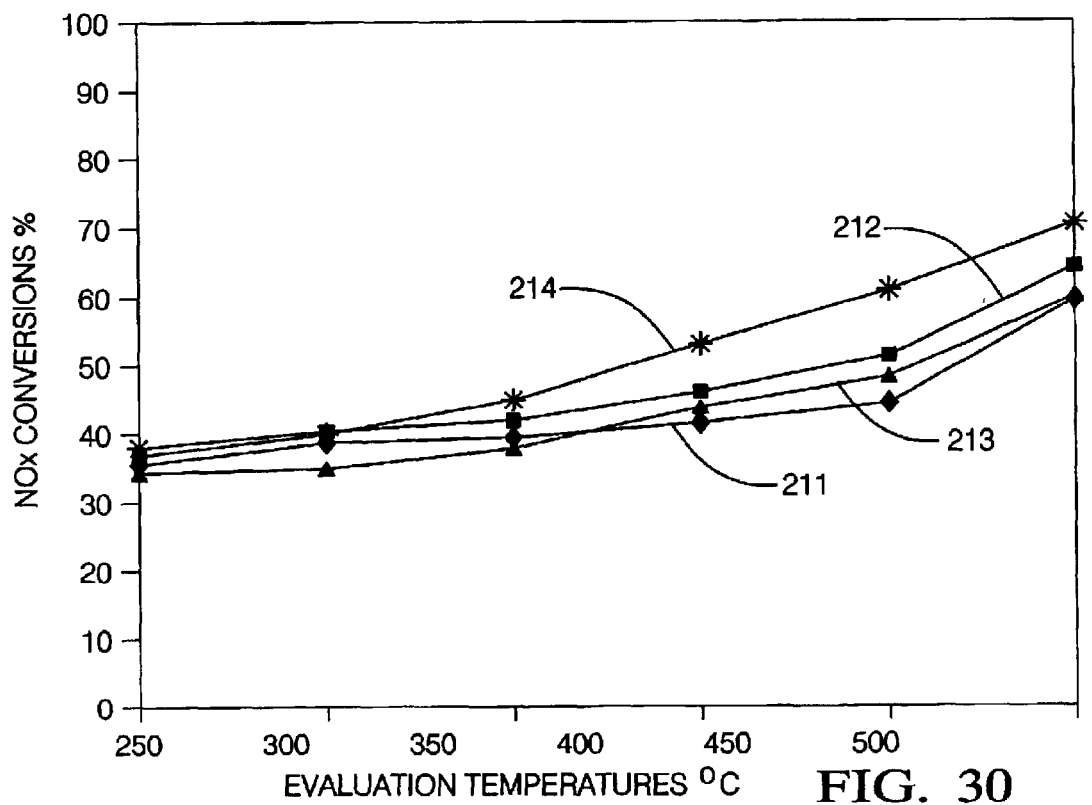
FIG. 30 is a graph showing HC performance for adsorber catalyst configurations with NiO disposed in the overlayer and underlayer, thermally treated NiO disposed in the overlayer and underlayer, NiO disposed primarily in the underlayer, NiO disposed in an NiO-containing layer disposed between the substrate and the underlayer and wherein platinum group metals are segregated within the overlayer and the underlayer.
Figure 31:
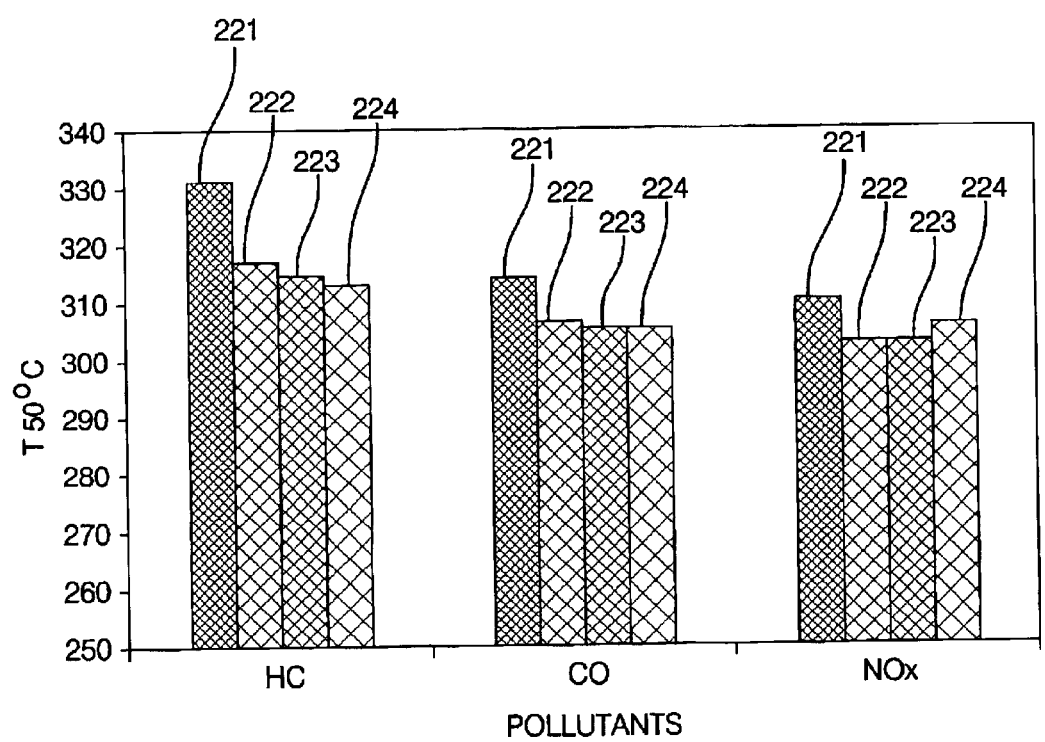
FIG. 31 is a graph showing light off performance for adsorber catalyst configurations with NiO disposed in the overlayer and underlayer, thermally treated NiO disposed in the overlayer and underlayer, NiO disposed primarily in the underlayer, NiO disposed in an NiO-containing layer disposed between the substrate and the underlayer and wherein platinum group metals are segregated within the overlayer and the underlayer.

The catalyst configurations were subjected to lean/rich aging at 800° C. for 20 hours. FIGS. 29, 30, and 31 show that the second (lines 202, 212, and 222), third (lines 203, 213, and 223), and fourth configurations (lines 204, 214, and 224), with thermally treated NiO disposed throughout the catalyst layer, NiO disposed primarily in the underlayer, and a NiO layer disposed between the substrate and the underlayer with segregated catalyst, respectively, performed better than the control (lines 201, 211, and 221), with the fourth configuration (lines 204, 214, and 224) having the best performance, for $NO_x$ conversions, HC conversions, and light off performance.

NiO can be employed in three-way catalysts to suppress $H_2S$ formation where the maximum aging temperature is in excess of 900° C. and the A/F ratio is vexy closely controlled to stoichiometric point of A/F of 14.56. However, at rich conditions, e.g., and A/F ratio of about 12 to 14 and at temperatures of about 700° C. to about 900° C., the NiO either reduces to its metallic form and/or reacts with the platinum group metals. The catalyst configurations herein, however, limit interactions with NiO to provide effective thermal durability and sulfur resistance. As such the negative effects of NiO on the precious metals are minimized or eliminated. The configurations enable a single $NO_x$ adsorber catalyst system to provide $NO_x$ storage, 3-way control, and $H_2S$ abatement. The configurations can be used in conjunction with direct injection gasoline engines, offering significant cost saving to consumers.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A catalyst configuration, comprising:

a substrate;

a NiO layer disposed on the substrate, wherein the NiO layer comprises greater than or equal to about 75 wt % of the NiO in the catalyst configuration; and a catalyst layer comprising a NOx adsorbing catalyst;

wherein no platinum group metal was added to the NiO layer.

2. The catalyst configuration of claim 1, further comprising a trapping material selected from the group consisting of barium carbonate, potassium carbonate, and combination thereof.

3. The catalyst configuration of claim 2, wherein the trapping material comprises barium carbonate and wherein the trapping material is disposed in the catalyst layer.

4. A catalyst configuration of claim 1, wherein the NiO comprises NiO that has been thermally treated to between about a maximum catalyst application temperature minus 100° C. and the maximum catalyst application temperature.

5. The catalyst configuration of claim 4, wherein the catalyst layer further comprises metal selected from the group consisting of platinum, palladium, rhodium, alloys thereof, and combinations thereof.

6. The catalyst configuration of claim 4, wherein the catalyst layer further comprises underlayer disposed between the NiO layer and an overlayer.

7. The catalyst configuration of claim 6, wherein the overlayer further comprises greater an or equal to about 75 wt % of palladium in the catalyst configuration.

8. The catalyst configuration of claim 6, the underlayer comprises platinum and greater than or equal to 75 wt % of the rhodium and is free of the palladium in the catalyst configuration.

9. The catalyst configuration of claim 1, wherein the catalyst layer further comprises metal selected from the group consisting of platinum, palladium, rhodium, alloys thereof, and combinations thereof.

10. A catalyst configuration, comprising:

a substrate;

a NiO layer disposed on the substrate, wherein the NiO layer comprises greater than or equal to about 75 wt % of the NiO in the catalyst configuration; and a catalyst layer comprising a NOx adsorbing catalyst;

wherein the catalyst layer further comprises an underlayer disposed between the NiO layer and an overlayer.

11. The catalyst configuration of claim 10, wherein the catalyst configuration further comprises palladium, and wherein the overlayer further comprises greater than or equal to about 75 wt % of the palladium.

12. The catalyst configuration of claim 11, wherein the overlayer is free of rhodium.

13. The catalyst configuration of claim 10, the underlayer comprises platinum and greater than or equal to 75 wt % of the rhodium in the catalyst layer.

14. The catalyst configuration of claim 13, wherein the underlayer is free of palladium.

15. A catalyst configuration, comprising:

a substrate a NiO layer disposed on the substrate, wherein the NiO layer comprises greater than or equal to about 75 wt % of the NiO in the catalyst configuration; and a catalyst layer comprising a NOx adsorbing catalyst;

wherein the NOx adsorbing catalyst has been post-impregnated into the catalyst layer on a side of the catalyst layer opposite the NiO layer.

16. A catalyst configuration, comprising:

a substrate;

a catalyst layer disposed on the substrate, wherein the catalyst layer comprises a NOx adsorbing catalyst and thermally treated NiO that has been thermally treated to between about a maximum catalyst application temperature minus 100° C. and the maximum catalyst application temperature;

wherein the NOx adsorbing catalyst has been post-impregnated into the catalyst layer on a side of the catalyst layer opposite the NiO layer.

* * * * *